May 13, 1952 F. B. BOLTE 2,596,202
SELF-ALIGNING CONTROLLED FRICTION BEARING
Filed Sept. 13, 1949
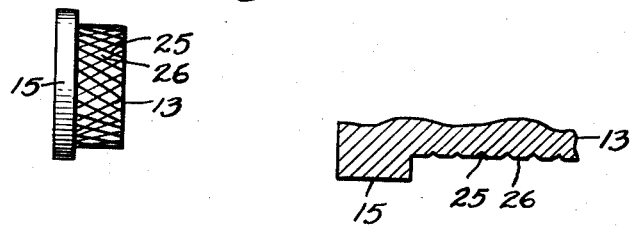
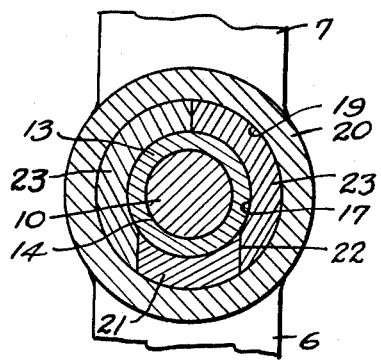
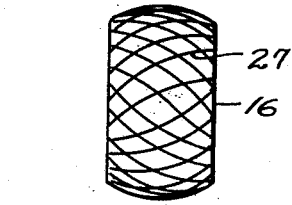
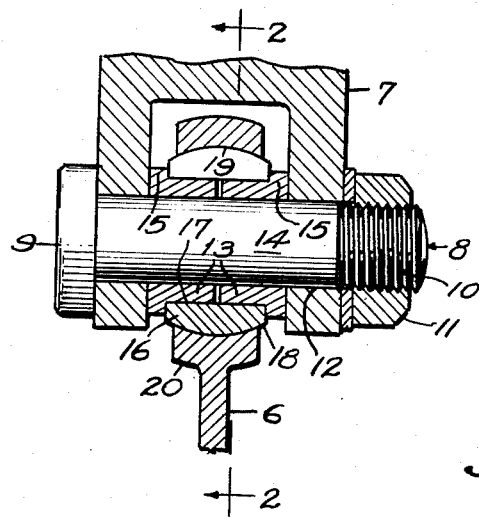
INVENTOR.
Frank B. Bolte
BY Lynn Letta
—ATTORNEY—

UNITED STATES PATENT OFFICE 2,596,202

SELF-ALIGNING CONTROLLED FRICTION BEARING

Frank B. Bolte, Los Angeles, Calif.

Application September 13, 1949, Serial No. 115,385

13 Claims. (Cl. 308—72)

This invention relates to a self-aligning controlled friction bearing. The invention is useful particularly in connection with yoke-type couplings (e. g., such as are used in aircraft or industrial equipment).

A general object of the invention is to provide a bearing having multiple bearing surfaces with controlled friction between the respective surfaces at a pre-determined friction ratio. Another object is to provide a bearing having multiple friction surfaces in which the friction is controlled so as to provide normally for relative rotation between one set of surfaces without relative rotation between the other set of surfaces but allowing the second set of surfaces to come into operation in the event of seizure between the first set of bearing surfaces. Another object is to provide a self-aligning bearing in which there are one or more sets of cylindrical bearing surfaces and a set of spherical bearing surfaces for self-alignment purposes, with controlled friction between the surfaces of the respective sets so as to control rotation in the self-aligning surfaces but to allow these surfaces to become rotational bearing surfaces in the event of seizure between the cylindrical bearing surfaces.

Other objects will become apparent in the ensuing specifications and appended drawings in which:

Fig. 1 is an axial sectional view of a yoke coupling embodying my improved bearing structure;

Fig. 2 is a transverse sectional view thereof taken on the line 2—2 of Fig. 1;

Fig. 3 is a side view of one of the bearing bushings;

Fig. 4 is an enlarged fragmentary sectional view of the bearing bushing; and

Fig. 5 is a side view of a modified form of the outer bearing bushing.

As an example of one form in which the invention may be embodied, I have shown my improved bearing structure as embodied in a yoke coupling in which a rod member 6 is coupled to a yoke or clevis member 7 for hinging movement which normally will be a simple rotational or oscillatory motion but is also capable of including a spherical pivotal movement for alignment purposes. The rod member 6 is coupled to the clevis member 7 through my improved bearing structure which includes a pivot pin 8 conventionally provided with a head 9 and a threaded end 10 (or two threaded ends) on which is threaded a nut or nuts 11 for securing the parts in assembled relationship. Pin 8 extends through bores 12 in the arms of clevis 7 and through a pair of bushings 13 having internal cylindrical surfaces journalled for rotation upon the cylindrical bearing surface 14 of pin 8. Each bushing 13 has at its outer end an annular radial flange 15.

Encircling bushings 13 is an annular sectional bearing bushing 16 having a cylindrical inner bearing surface 17 bearing upon the external surfaces of bushings 13. Sectional bushing 16 has a spherical outer bearing surface 18 which is journalled within a spherical inner bearing surface 19 in an annular head portion 20 of rod 6. The ends of bushing 16 bear against flanges 15 and flanges 15 in turn bear against the inner sides of the arms of clevis 7.

Sectional bushing 16 is in three or more sections one of which, indicated at 21 in Fig. 2, has parallel end faces 22 which mate with end faces of the other two sections 23, which last mentioned end faces are, in the assembled bushing, correspondingly parallel.

The bearing is assembled by inserting the two bushing sections 23 into the annular head 20, then inserting bushing section 21 between the spaced parallel ends of sections 23, then inserting bushings 13 axially into the bearing bore 17 of the assembled bushing 16. This assembly of bushings and annular head 20 is then inserted into clevis 7 and pin 8 is inserted axially through bushings 13.

The external bearing faces of bushings 13 are interrupted by depressions or serrations 25 which are machined or cast into the outer surfaces of the bushing. The depressions or serrations 25 are preferably arranged in geometrical patterns, and may, for example, take the form of knurling, or, more accurately, a plurality of grooves or serrations crossing each other to form diamond shaped raised pads having bearing surfaces 26. In this manner, the total area of bearing surfaces 26 is regulated so as to obtain a desired friction ratio between bushings 13 and bushing 16. That is to say, the areas are so regulated as to control the friction between bushings 13 and bushings 16 and also to control the friction between bushings 13 and pin 8, in any desired ratio. For example, the friction may be controlled in such a ratio that the friction between bushings 13 and bushing 16 will be greater than that between bushing 13 and pin 8 and less than that between bushing 16 and annular head 20. Thus it becomes possible to provide an arrangement in which rotation will normally take place between bushings 13 and pin 8. In the event of seizure between bushings 13 and pin 8, rotation will next occur between bushings 13 and bushing 16. In event of seizure between bushings 13 and bushing 16, rotation will then take place between bushing 16 and annular head 20. Thus rotation between bushing 16 and annular head 20 may be utilized only for aligning purposes, and hence there will be no wear between these surfaces. Consequently, a snug connection will be maintained between bushings 16 and head 20 and accurate centering of the head 20 with relation to clevis 7 will be maintained. By confining the wear to the coacting bearing surfaces of pin 8 and bushings 13, it will never be necessary to replace either bushing 16 or ring 20. After excessive wear has taken place, the joint may be restored by replacing pin 8 or bushing 13 or both. In either event, the cost of replacement will be much less than that of replacing bushing 16 or ring 20.

The segmental structure of bushing 16 assists in the distribution of lubrication in the bearing. Segmentation may be adjusted to obtain the best compromise between lubrication and surface contact area desiderata.

In the modification of the invention indicated in Fig. 5, additional adjustment of the frictional ratios between the several bearings surfaces is obtained by providing the outer bearing surface 18 of bushing 16 with serrations or depressions 27 similar to those in the outer surface of bushings 13. The serrations can be located in the inner face of bushing 16 instead of the outer faces of bushings 13, where desired.

I claim:

1. In a bearing, a bearing pin, a pair of bushings through which said pin extends, said bushings being journalled upon said pin, a third bushing encircling both of said pair of bushings and journalled thereon, said third bushing having a spherical external bearing surface, and a ring having a spherical internal bearing surface encircling said third bushing and journalled thereon, at least one of said bushings having a series of interrupted bearing surfaces having their total area selected so as to adjust the ratio of friction between the various bearing surfaces to effect a desired ratio of relative rotation between said bushings and said ring.

2. In a bearing, a bearing pin, a pair of bushings through which said pin extends, said bushings being journalled upon said pin, a third bushing encircling both of said pair of bushings and journalled thereon, said third bushing having a spherical external bearing surface, and a ring having a spherical internal bearing surface encircling said third bushing and journalled thereon, at least one of said bushings having a series of interrupted bearing surfaces having their total area selected so as to adjust the ratio of friction between the various bearing surfaces to effect a greater tendency for rotation to occur between said third bushing and said pair of bushings than between said third bushing and said ring.

3. In a bearing, a bearing pin, a pair of bushings through which said pin extends, said bushings being journalled upon said pin, a third bushing encircling both of said pair of bushings and journalled thereon, said third bushing having a spherical external bearing surface, and a ring having a spherical internal bearing surface encircling said third bushing and journalled thereon, at least one of said bushings having a series of interrupted bearing surfaces having their total area selected so as to adjust the ratio of friction between the various bearing surfaces to effect a greater tendency for rotation to occur between said pair of bushings and said pin than either between said pair of bushings and said third bushing or between said third bushing and said ring.

4. In a bearing, a bearing pin, a pair of bushings through which said pin extends, said bushings being journalled upon said pin, a third bushing encircling both of said pair of bushings and journalled thereon, said third bushing having a spherical external bearing surface, and a ring having a spherical internal bearing surface encircling said third bushing and journalled thereon, at least one of said bushings having a series of interrupted bearing surfaces having their total area selected so as to adjust the ratio of friction between the various bearing surfaces to provide for normal rotation occurring only between said pair of bushings and said pin; to provide for rotation between said pair of bushings and said third bushing without rotation between said third bushing and said ring in the event of seizure between said pair of bushings and said pin; and to provide for rotation between said third bushing and said ring in the event of seizure between said pair of bushings and both said pin and said third bushing.

5. In a bearing, a bearing pin, a pair of bushings journalled upon said pin, a third bushing journalled upon said pair of bushings and having a spherical external bearing surface, and a bearing ring encircling and having a spherical internal bearing surface journalled upon said spherical external bearing surface, the outer surfaces of said pair of bushings comprising a series of interrupted bearing surfaces having a total area such that rotation will normally occur between said pair of bushings and said third bushing before it will occur between said third bushing and said ring.

6. In a bearing, a bearing pin, a pair of bushings journalled upon said pin, a third bushing journalled upon said pair of bushings and having a spherical external bearing surface, and a bearing ring encircling and having a spherical internal bearing surface journalled upon said spherical external bearing surface, the outer surfaces of said pair of bushings comprising a series of interrupted bearing surfaces having a total area such that rotation will normally occur between said pair of bushings and said third bushing before it will occur between said third bushing and said ring and such that rotation will normally occur between said pair of bushings and said pin before it will occur between said pair of bushings and said third bushing.

7. A bearing as defined in claim 6, wherein said spherical outer surface of said third bushing consists in a plurality of interrupted bearing surfaces selected so as to adjust the friction between said third bushing and said ring to a selected ratio with reference to the friction between said pair of bushings and said third bushing.

8. A bearing as defined in claim 5, wherein only the inner surfaces of said pair of bushings are continuous.

9. In a bearing, a bearing pin, an inner bushing through which said pin extends, an intermediate bushing encircling and journalled on said inner bushing, said intermediate bushing having a spherical external bearing surface, and a ring having a spherical internal bearing surface encircling said intermediate bushing and journalled thereon, at least one of said bushings having a series of interrupted bearing surfaces having their total area selected so as to adjust the ratio of friction between the various bearing surfaces to effect a desired ratio of relative rotation between said bushings and said ring.

10. In a bearing, a bearing pin, an inner bushing through which said pin extends, an intermediate bushing encircling and journalled on said inner bushing, said intermediate bushing having a spherical external bearing surface, and a ring having an internal bearing surface encircling said intermediate bushing and journalled thereon, said intermediate bushing comprising a plurality of bushing segments at least one of said bushings having a series of interrupted bearing surfaces having their total area selected so as to adjust the ratio of friction between the various bearing surfaces to effect a desired ratio of relative rotation between said bushings and said ring.

11. In a bearing: an inner bushing having an internal cylindrical bearing surface for bearing upon a bearing pin; an intermediate bushing encircling and journalled on said inner bushing, said intermediate bushing having a spherical external bearing surface; and a ring having an internal bearing surface encircling said intermediate bushing and journalled thereon, said intermediate bushing comprising a plurality of bushing segments, at least one of said bushings having a series of interrupted bearing surfaces having their total area selected so as to adjust the ratio of friction between the various bearing surfaces to effect a desired ratio of relative rotation between said bushings and said ring.

12. In a bearing: an inner bushing having an internal cylindrical bearing surface for bearing upon a bearing pin; an intermediate bushing encircling and journalled on said inner bushing, said intermediate bushing having a spherical external bearing surface; and a ring having an internal bearing surface encircling said intermediate bushing and journalled thereon, said intermediate bushing comprising a plurality of bushing segments, at least one of said bushings having a series of interrupted bearing surfaces having their total area selected so as to adjust the ratio of friction between the various bearing surfaces to effect a desired ratio of relative rotation between said bushings and said ring, said inner bushing having radially outwardly projecting abutment means interengaging with said intermediate bushing to restrain relative axial movement therebetween.

13. In a bearing: an inner bushing having an internal cylindrical bearing surface for bearing upon a bearing pin; an intermediate bushing encircling and journalled on said inner bushing, said intermediate bushing having a spherical external bearing surface; and a ring having an internal bearing surface encircling said intermediate bushing and journalled thereon, said intermediate bushing comprising a plurality of bushing segments, at least one of said bushings having a series of interrupted bearing surfaces having their total area selected so as to adjust the ratio of friction between the various bearing surfaces to provide for normal rotation occurring only between said bushing segments and said pin; to provide for rotation between said pair of bushings and said third bushing without rotation between said third bushing and said ring in the event of seizure between said pair of bushings and said pin; and to provide for rotation between said third bushing and said ring in the event of seizure between said pair of bushings and both said pin and said third bushing.

FRANK B. BOLTE.

REFERENCES CITED

The following references are of record in the file of this patent:

UNITED STATES PATENTS

| Number | Name | Date |
| --- | --- | --- |
| 460,132 | Hoen | Sept. 29, 1891 |
| 2,478,056 | Reeg | Aug. 2, 1949 |